(12) United States Patent
Otake

(10) Patent No.: US 10,406,952 B2
(45) Date of Patent: Sep. 10, 2019

(54) VEHICLE SEAT

(71) Applicant: TS TECH CO., LTD., Asaka-shi, Saitama (JP)

(72) Inventor: Shigekazu Otake, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 22 days.

(21) Appl. No.: 15/562,591

(22) PCT Filed: Jul. 21, 2016

(86) PCT No.: PCT/JP2016/071354
§ 371 (c)(1),
(2) Date: Sep. 28, 2017

(87) PCT Pub. No.: WO2017/022493
PCT Pub. Date: Feb. 9, 2017

(65) Prior Publication Data
US 2018/0086240 A1    Mar. 29, 2018

(30) Foreign Application Priority Data

Aug. 4, 2015   (JP) ................................. 2015-154040

(51) Int. Cl.
*B60N 2/66*    (2006.01)
(52) U.S. Cl.
CPC ........... *B60N 2/6673* (2015.04); *B60N 2/666* (2015.04)
(58) Field of Classification Search
CPC .............................. B60N 2/6673; B60N 2/666
See application file for complete search history.

(56) References Cited

U.S. PATENT DOCUMENTS

| 6,270,158 B1 | 8/2001 | Hong |
| 6,758,522 B2 | 7/2004 | Ligon, Sr. et al. |

(Continued)

FOREIGN PATENT DOCUMENTS

| CN | 1564666 A | 1/2005 |
| CN | 102452344 A | 5/2012 |

(Continued)

OTHER PUBLICATIONS

International Search Report for PCT/JP2016/071354, dated Sep. 27, 2016, 5 pages including English translation.

(Continued)

*Primary Examiner* — David R Dunn
*Assistant Examiner* — Tania Abraham
(74) *Attorney, Agent, or Firm* — Hamre, Schumann, Mueller & Larson, P.C.

(57) ABSTRACT

In a vehicle seat, a seat back frame includes a support hole disposed at an upper part thereof and a support portion disposed at a lower part thereof, the support hole extending through the seat back frame in such a direction as to connect an upper side and a lower side thereof. A pressure-receiving member comprises a pressure-receiving member main body, an upper restriction portion, and a lower hook portion. The upper restriction portion is inserted in the support hole, thereby restricting a position of an upper part of the pressure-receiving member in front-rear and lateral directions. The lower hook portion includes a first portion extending from the lower part of the pressure-receiving member main body and protruding rearward over an upper side of the support portion, and a second portion extending from a rear end of the first portion and lying along a rear side of the support portion.

20 Claims, 12 Drawing Sheets

(56) References Cited

U.S. PATENT DOCUMENTS

| | | |
|---|---|---|
| 8,870,292 B2 | 10/2014 | Sakai et al. |
| 2003/0006636 A1 | 1/2003 | Ligon, Sr. et al. |
| 2004/0169407 A1 | 9/2004 | Ligon, Sr. et al. |
| 2004/0245823 A1 | 12/2004 | Ligon, Sr. et al. |
| 2008/0217978 A1 | 9/2008 | Stossel et al. |
| 2011/0121624 A1* | 5/2011 | Brncick .............. B60N 2/0232 297/284.2 |
| 2012/0112512 A1 | 5/2012 | Sakai et al. |
| 2014/0346827 A1* | 11/2014 | Suzuki .................. A47C 7/462 297/284.7 |
| 2015/0091349 A1* | 4/2015 | Hong .................... B60N 2/666 297/284.7 |
| 2016/0221481 A1 | 8/2016 | Sugiyama |

FOREIGN PATENT DOCUMENTS

| | | |
|---|---|---|
| JP | 2005508212 A | 3/2005 |
| JP | 2009502381 A | 1/2009 |
| JP | 2012095950 A | 5/2012 |
| JP | 2015110427 A | 6/2015 |

OTHER PUBLICATIONS

Office Action issued for Chinese Patent Application No. 201680018719. 5, dated, dated Dec. 11, 2018, 10 pages including English translation.

Office Action issued for Japanese Patent Application No. 2017-532486, dispatch date Apr. 9, 2019, 4 pages including English translation.

* cited by examiner

FIG.6
(a)
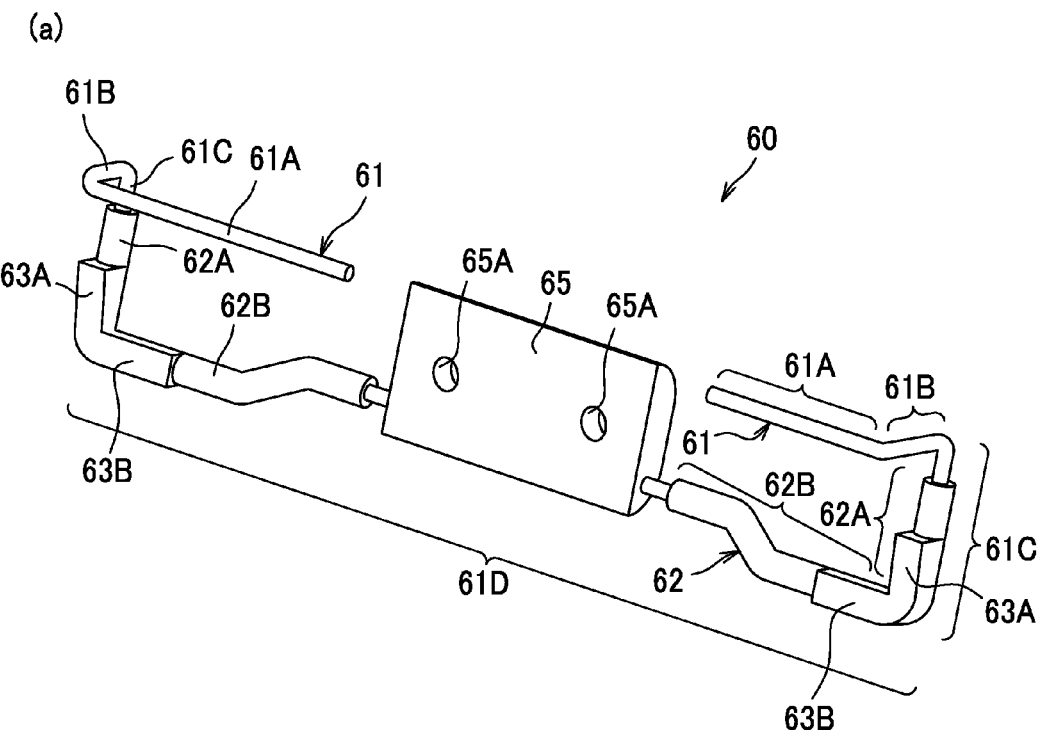
(b)
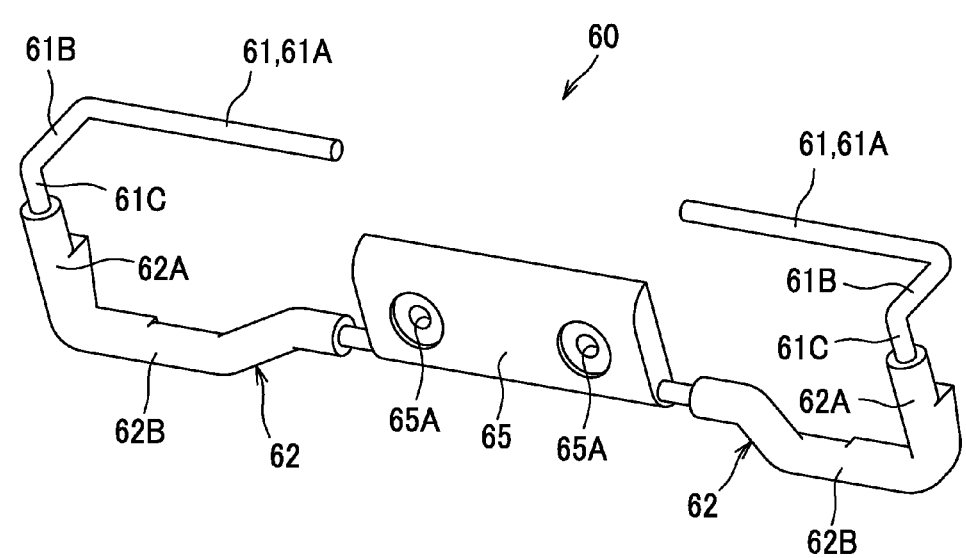

VEHICLE SEAT

TECHNICAL FIELD

The present invention relates to a vehicle seat including a pressure-receiving member provided in a seat back.

BACKGROUND ART

A vehicle seat in which a pressure-receiving member including a pressure-receiving plate for receiving a load from a back of an occupant is provided in a seat back is hitherto known in the art (Patent Documents 1, 2). In the seats disclosed therein, the pressure-receiving member is slung between and supported by left and right separately located side frames of a seat back frame.

CITATION LIST

Patent Literature

Patent Document 1: JP 2009-502381 A
Patent Document 2: JP 2015-110427 A

SUMMARY OF INVENTION

The recent-year trend in vehicle seats is towards a growing number of devices installed for various purposes including but not limited to provision of passenger comfort and improvement in safety. To this end, improved ease of installation work for a large number of parts is desired. In addition, efficient utilization of space inside the seat is also desired.

With this as a backdrop, the present invention has been made in an attempt to provide a vehicle seat for which improved ease of installation work of a pressure-receiving member is ensured.

In one aspect of the present invention, a vehicle seat is provided which comprises a seat back frame and a pressure-receiving member supported by the seat back frame, the pressure-receiving member including a pressure-receiving plate configured to receive a load from a back of an occupant. The seat back frame includes a support hole disposed at an upper part thereof and a support portion disposed at a lower part thereof, the support hole extending through the seat back frame in such a direction as to connect an upper side and a lower side thereof; whereas the pressure-receiving member comprises a pressure-receiving member main body including the pressure-receiving plate, an upper restriction portion disposed at an upper part of the pressure-receiving member main body, and a lower hook portion disposed at a lower part of the pressure-receiving member main body. The upper restriction portion is configured to be inserted in the support hole to thereby restrict a position of an upper part of the pressure-receiving member in front-rear and lateral directions; whereas the lower hook portion includes a first portion extending from the lower part of the pressure-receiving member main body and protruding rearward over an upper side of the support portion, and a second portion extending from a rear end of the first portion and lying along a rear side of the support portion, such that the lower part of the pressure-receiving member main body is mountable to the seat back frame by using the first portion and the second portion.

With this configuration, after insertion of the upper restriction portion in the support hole of the seat back frame, the lower hook portion may be so located on the support portion as to lie along the upper side to the rear side of the support portion, so that the position in the front-rear and lateral directions is restricted at the upper restriction portion, and the pressure-receiving member main body is made unlikely to come off in the downward and frontward directions at the lower hook portion. Accordingly, the pressure-receiving member can be easily mounted into and supported by the seat back frame; thus the ease of installation work is improved.

In the vehicle seat as described above, the seat back frame includes side frames disposed in laterally separate positions, and the support portion may be a connecting member by which lower portions of the side frames are connected with each other. Additionally or alternatively, the seat back frame may include a bridging member by which upper portions of the side frames are connected with each other; in this configuration, the support hole may preferably be disposed in the bridging member.

With this configuration, the pressure-receiving member can be supported by members connecting the left and right side frames; therefore, the side frames can be made available for installation of other parts, so that efficient utilization of space can be promoted.

In the vehicle seat as described above, the support portion may preferably be disposed between the lower hook portion and the lower part of the pressure-receiving member main body.

This configuration, in which the lower hook portion and the pressure-receiving member main body sandwiches the support frame, serves to stabilize the pressure-receiving member.

In the vehicle seat as described above, the lower hook portion may preferably include a first contact portion extending in a first direction at the rear side of the support portion to contact the support portion, and a second contact portion extending in a second direction different from the first direction at the rear side of the support portion to contact the support portion.

This configuration in which the first contact portion extending in the first direction and the second contact portion extending in the second direction are provided to contact the support portion serves to stabilize the position of the lower hook portion relative to the support portion, and to thus stabilize the pressure-receiving member.

The above-described vehicle seat may further comprise a fastening member with which the lower hook portion is fastened to the support portion (i.e. the lower hook portion includes an attaching portion to be fastened by the fastening member). Herein, the first contact portion and the second contact portion may preferably be both located on each of left and right sides of the fastening member.

With this configuration, the lower portion of the pressure-receiving member main body can be fastened to the lower part of the seat back frame, so that the pressure-receiving member can be fixed securely to the seat back frame. Moreover, location of the first contact portion and the second contact portion on each of the left and right sides of the fastening member serves to stabilize the posture of the lower hook portion relative to the support portion; accordingly, the pressure-receiving member can be stabilized.

In the vehicle seat as described above, the lower hook portion may include a wire and a covering provided to cover at least part of the wire, and the first contact portion and the second contact portion may be provided on the covering.

With this configuration, at the first contact portion and the second contact portion, direct contact of the wire with the support portion can be avoided; thus, noise can be reduced.

In the vehicle seat as described above, the lower hook portion may preferably be provided to be rotatable relative to the pressure-receiving member main body.

With this configuration, the lower hook portion can be turned around the support portion and thus easily located at the rear side of the support portion; thus, the ease of installation work is improved.

In the vehicle seat as described above, the lower hook portion may preferably have a springiness with which the lower hook portion is configured to bias the pressure-receiving member main body toward the seat back frame.

The lower hook portion with such a springiness may ensure that the pressure-receiving member main body is biased toward the seat back frame and thus kept stable; thus, the ease of installation work is improved more.

The pressure-receiving member main body may include a restriction portion engageable with the support portion to thereby restrict a position of the pressure-receiving member main body in a vertical direction.

With this configuration, the position of the pressure-receiving member in the vertical direction is restricted by the restriction portion; therefore, the pressure-receiving member, when tentatively mounted to the seat back frame and fastened by the fastening member, can be worked on with increased ease.

The vehicle seat configured as described above may further comprise a fastening member with which the lower hook portion is fastened to the support portion, and the lower hook portion may be configured to include an attaching portion to be fastened by the fastening member.

In the vehicle seat as described above, the lower hook portion may be disposed in such a position that at least part of the lower hook portion overlaps the pressure-receiving plate as viewed from a front or rear direction.

BRIEF DESCRIPTION OF DRAWINGS

FIG. 6 includes (a) a perspective view of a lower hook portion as viewed from a front side, and (b) a perspective view of the lower hook portion as viewed from a rear side.

DESCRIPTION OF EMBODIMENT(S)

Figure 1:
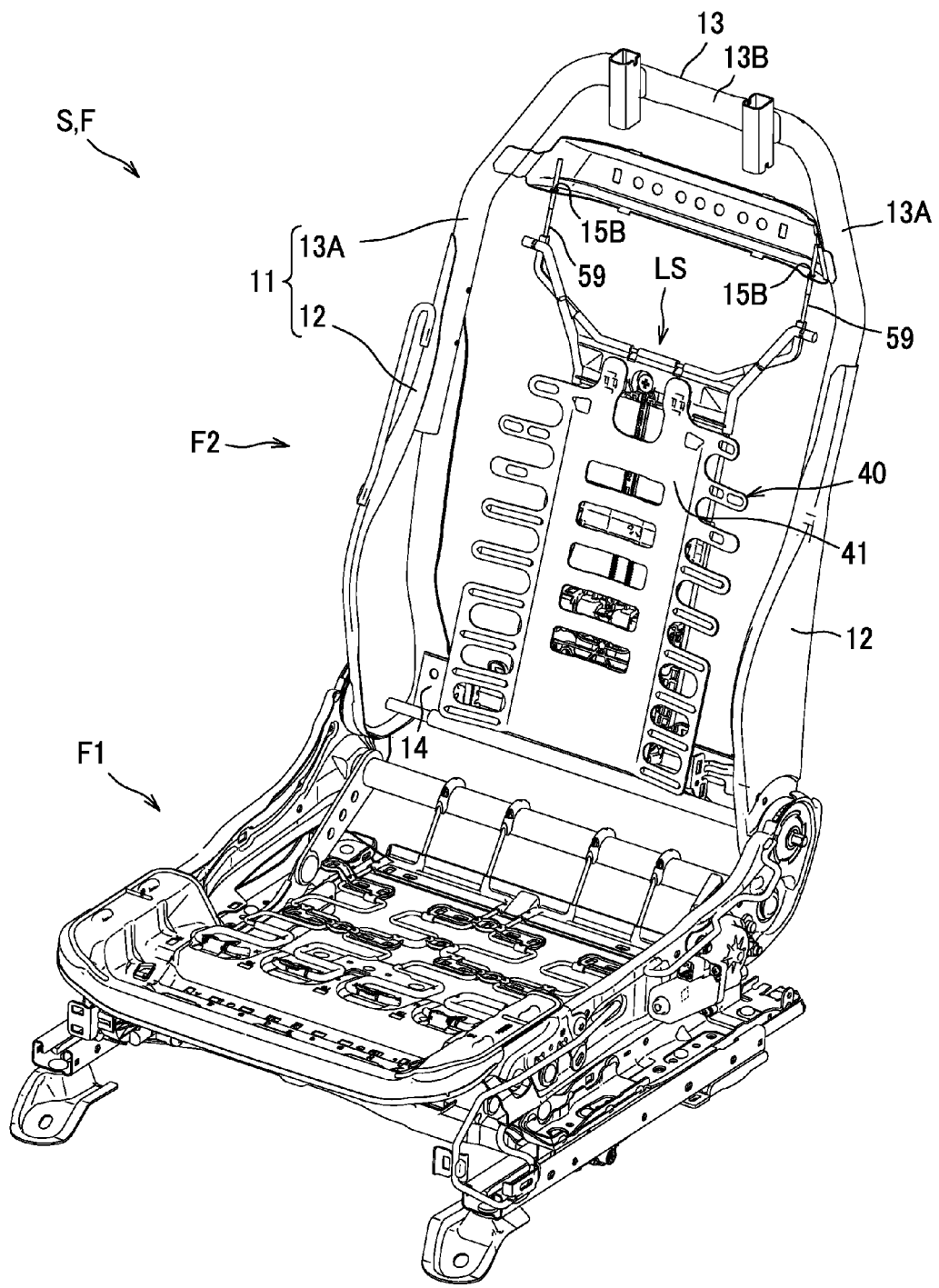
FIG. 1 is a perspective view of a seat frame.

Hereafter, an embodiment of the present invention will be described with reference made to the drawings where appropriate. As shown in FIG. 1, a car seat S as an example of a vehicle seat is a seat to be installed in a car, and configured, as well known in the art, to include a seat frame F (shown) upholstered with a seat cushion member (not shown) covered thereon. The seat frame F includes a seat cushion frame F1 and a seat back frame F2, and the seat back frame F2 is connected to a rear end portion of the seat cushion frame F1 via a reclining mechanism. In the following description, the front/rear (frontward/rearward), left/right (leftward/rightward; lateral) and upper/lower (upward/downward; vertical) directions will be designated with reference to an occupant seated on the car seat S.

The seat back frame F2 supports a lumbar support device LS as an example of a pressure-receiving member.

Figure 2:
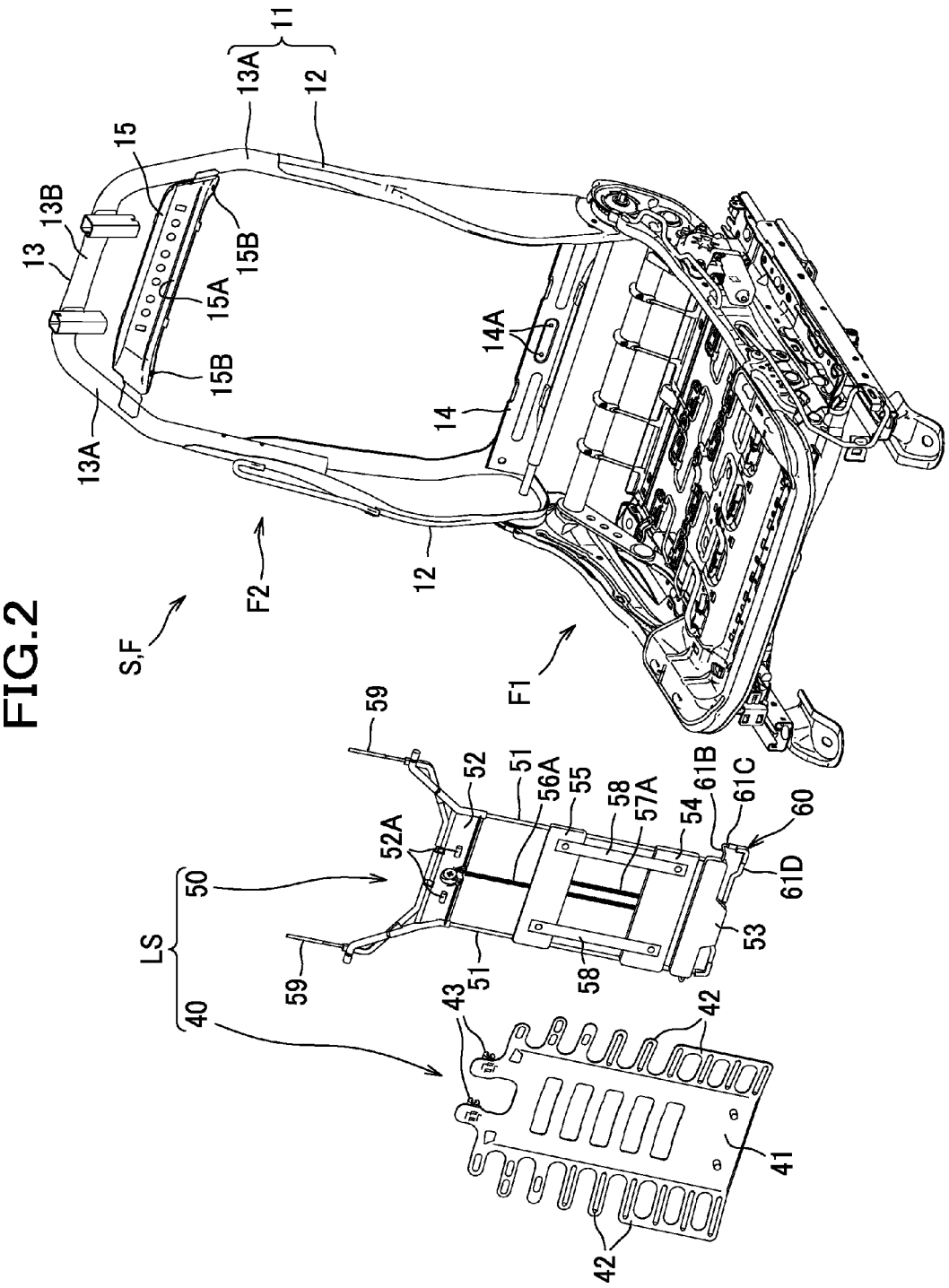
FIG. 2 is a perspective view showing a state in which a pressure-receiving plate and a support frame are disassembled from the seat frame.

As shown in FIG. 2, the seat back frame F2 includes a pair of sheet metal frames 12 disposed in laterally separate positions, and a pipe frame 13 made by bending a pipe material into a U shape and connected to upper ends of the pair of sheet metal frames 12.

The pipe frame 13 includes a pair of left and right upper side frames 13A that extend upward from the sheet metal frames 12 vertically up to some midpoint and slightly inclined therefrom toward laterally inner sides of the sheet metal frames 12. The left and right sheet metal frames 12 and the upper side frames 13A constitute a pair of left and right side frames 11 disposed in laterally separate positions. The pipe frame 13 further includes an upper frame 13B by which upper end portions of the pair of upper side frames 13A (i.e., upper end portions of the side frames 11) are connected to each other.

The seat back frame F2 includes a lower frame 14 as an example of a connecting member or a support portion by which lower portions of the side frames 11 (to be more specific, lower portions of the sheet metal frames 12) are connected to each other, and a bridging frame 15 as an example of a bridging member by which upper portions of the side frames 11 (to be more specific, the left and right upper side frames 13A) are connected to each other in a position lower than that of the upper frame 13B.

The lower frame 14 is a member made of sheet metal having an upper edge and a lower edge shaped to extend frontward to a small extent in cross section. The lower frame 14 has an elongate shape long in the lateral direction, with its left and right end portions are fixed to laterally inwardly extending portions of the left and right sheet metal frames 12, respectively, by welding. In a center of the lower frame 14 (of a lower part of the seat back frame F2) are formed two mounting holes 14A disposed in positions slightly separated laterally from each other. When the seat back frame F2 is in a normal non-reclined position, the lower frame 14 has its front and back sides oriented to face in the front and rear directions, and the mounting holes 14A extend through the lower frame 14 in such a direction as to connect the front side and the back (rear) side. The mounting holes 14A provide structures in which screws 91 (see FIG. 8) as an example of fastening members with which the lower hook portion 60 (which will be described later) is fastened to the lower frame 14 are inserted.

Figure 7:
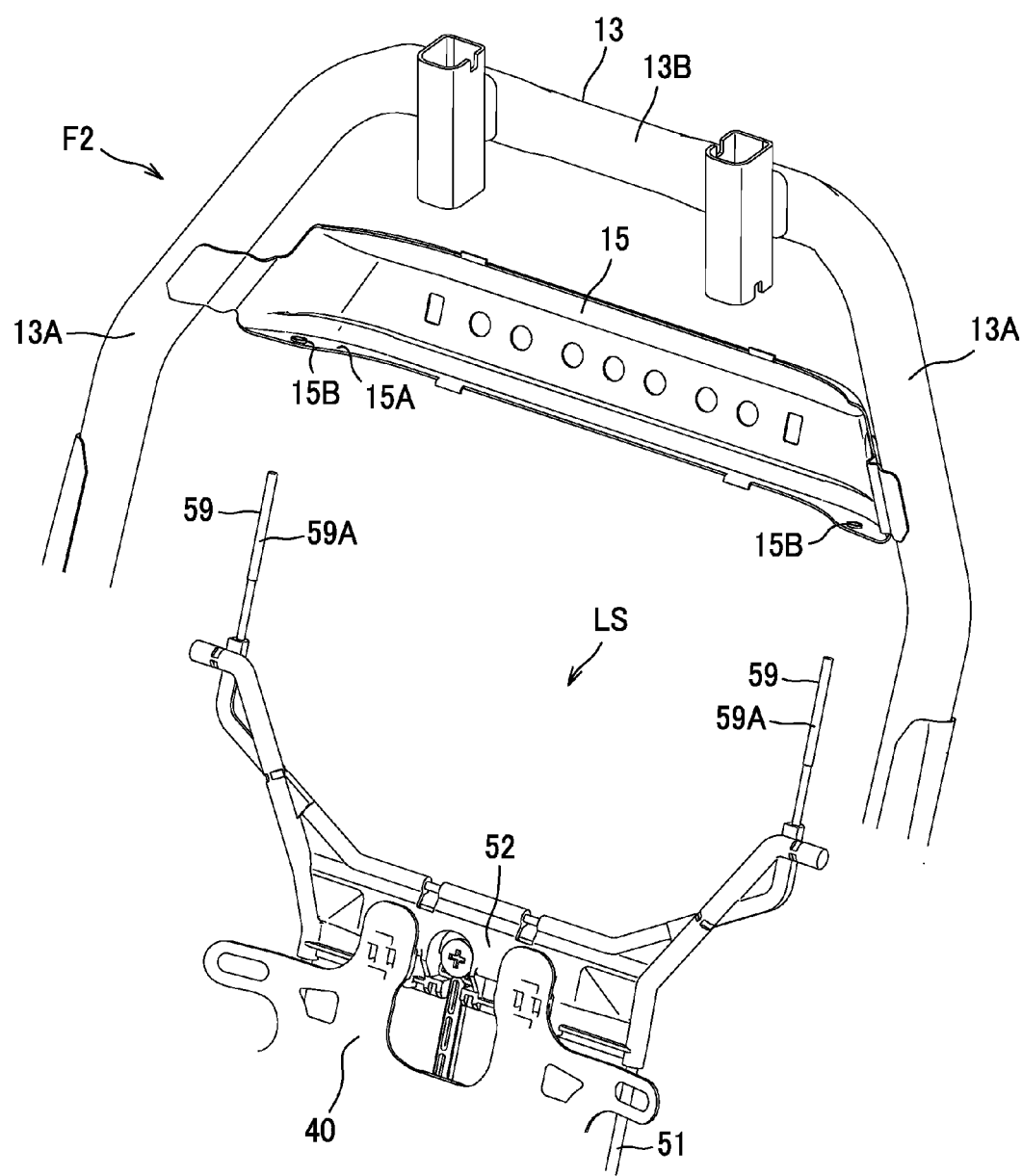
FIG. 7 is a perspective view illustrating the operation of inserting upper restriction portions of the lumbar support device into support holes.

The bridging frame 15 includes, at a lower edge thereof, a lower flange 15A extending frontward (see FIG. 7). The lower flange has support holes 15B formed in this lower flange 15A, which support holes 15B extends through the lower flange 15A in such a direction as to connect an upper side and a lower side thereof.

The lumbar support device LS is a device configured to receive, and transmit to the seat back frame F2, a force produced when an occupant is leaning on the seat back, and to change the shape of a portion of the seat back on which a lumbar region of the occupant is to be laid, so that the lumbar region support condition may be changed according to the preferences of the occupant.

The lumbar support device LS includes a pressure-receiving plate 40 configured to receive a load from a back of an occupant through a cushion member (not shown), a supporting member 50 configured to support the pressure-receiving plate 40 and to change the shape of the pressure-receiving plate 40, and a lower hook portion 60 for use in fixing the lower part of the supporting member 50 (lumbar support device LS) to the lower frame 14.

The pressure-receiving plate 40 is a plate-shaped member made of plastic or other materials, and includes a center portion 41 designed to be located right behind the back of an occupant, and a pair of side portions 42 disposed at left and right sides of the center portion 41 and configured to protrude frontward farther than the center portion 41. The side portions 42 are designed to support the left and right sides of the back of the occupant. The side portions 42 include a plurality of narrow plate-shaped portions extending obliquely frontward so as to have an appropriate level of flexibility so that the sides of the back of the occupant can be received softly. Of the narrow plate-shaped portions of each side portion 42, the lower four members are connected at their distal ends and thus have a rigidity higher than the upper five members to some extent.

Two mounting hooks 43 are arranged side by side at an upper region of the back side surface of the pressure-receiving plate 40. Each of the mounting hooks 43 has a C-shaped configuration (which opens rearward) as viewed from a lateral direction.

The supporting member 50 includes guidewires 51, an upper connecting portion 52, a lower connecting portion 53, a lower up-and-down motion plate 54, an upper up-and-down motion plate 55, a support portion raising and lowering mechanism 56 (see FIG. 3), an arch deformation mechanism 57 (see FIG. 3), arch members 58, and support wires 59 as an example of an upper restriction portion.

The guide wires 51 are wires elongate in an upward-downward direction; herein, two guide wires 51 are disposed in positions laterally separate from and parallel to each other. It is to be understood that, although not illustrated, the two guide wires 51 are connected inside the lower connecting portion 53, and may thus be construed in their entirety as a U-shaped wire.

The upper connecting portion 52 is a portion by which upper portions of the two guide wires 51 are connected. The upper connecting portion 52 is made of plastic, and formed through insert molding process, by which the guide wires 51 are integrated with the upper connecting portion 52. Provided on the front surface of the upper connecting portion 52 are two cylindrical support projections 52A which are arranged side by side and of which axes extend in the lateral direction. The support projections 52A are disposed in positions corresponding to the two mounting hooks 43, and the mounting hooks 43 are engaged on the outsides of the support projections 52A, so that the pressure-receiving plate 40 is swingably supported by the support projections 52A.

The lower connecting portion 53 is a portion by which lower portions of the two guide wires 51 are connected so that the rigidity of the lower parts of the guide wire 51 is maintained, and by which the lumbar support device LS is fixed to the seat back frame F2. The lower connecting portion 53 is made of plastic, and formed through insert molding process, by which the guide wires 51 are integrated with the lower connecting portion 53; as described above, the laterally extending lower portion of the U-shaped guide wire 51 is held inside the lower connecting portion 53.

Figure 3:
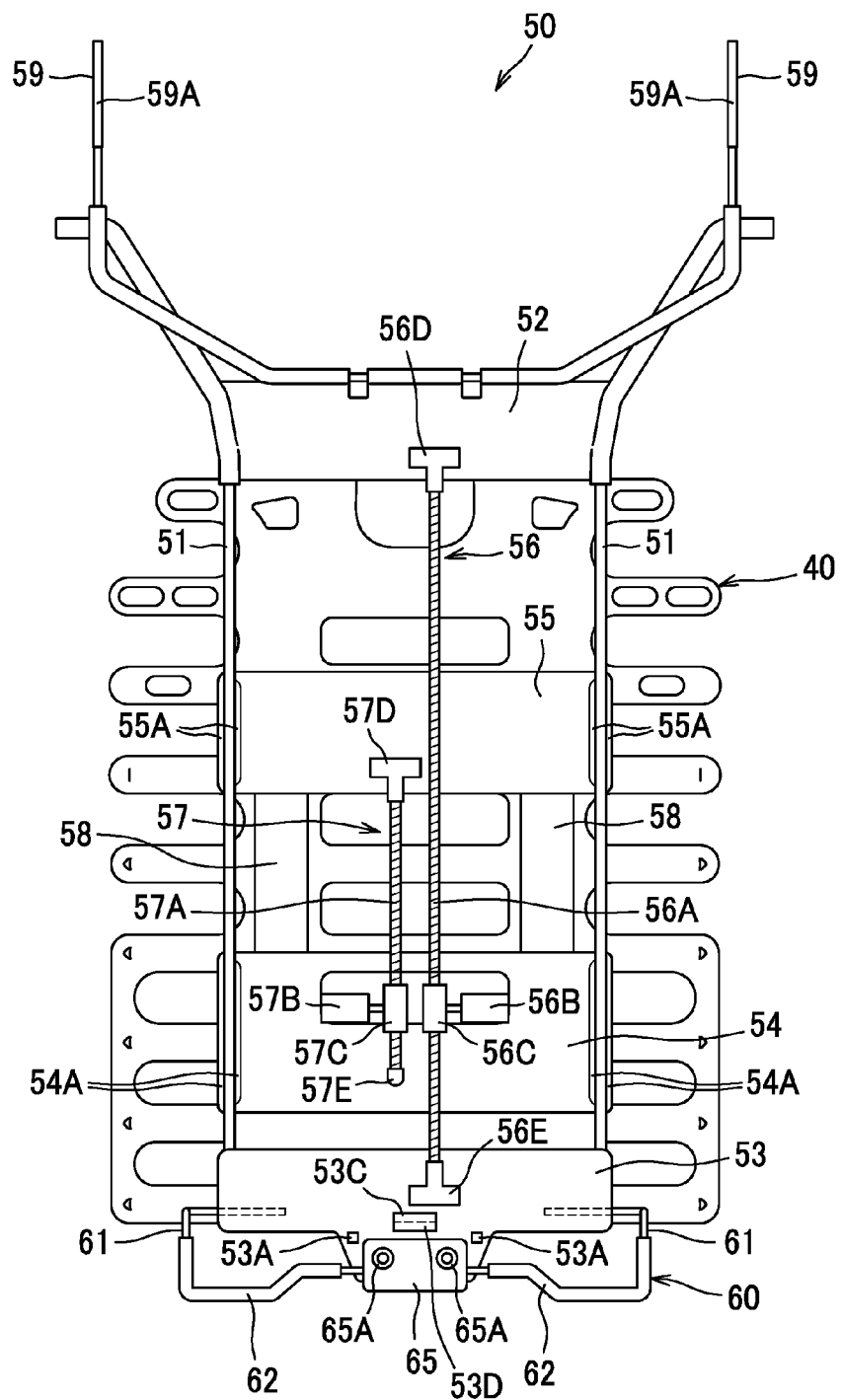
FIG. 3 is a rear view of a lumbar support device.

As shown in FIG. 3, in a lower region of the back side surface of the lower connecting portion 53 are provided two projections 53A disposed in positions laterally separate from each other. The projections 53A are portions which come in contact with a front surface 14C of the lower frame 14 when the lumbar support device LS is mounted to the seat back frame F2 (see FIGS. 10 and 11).

Figure 8:
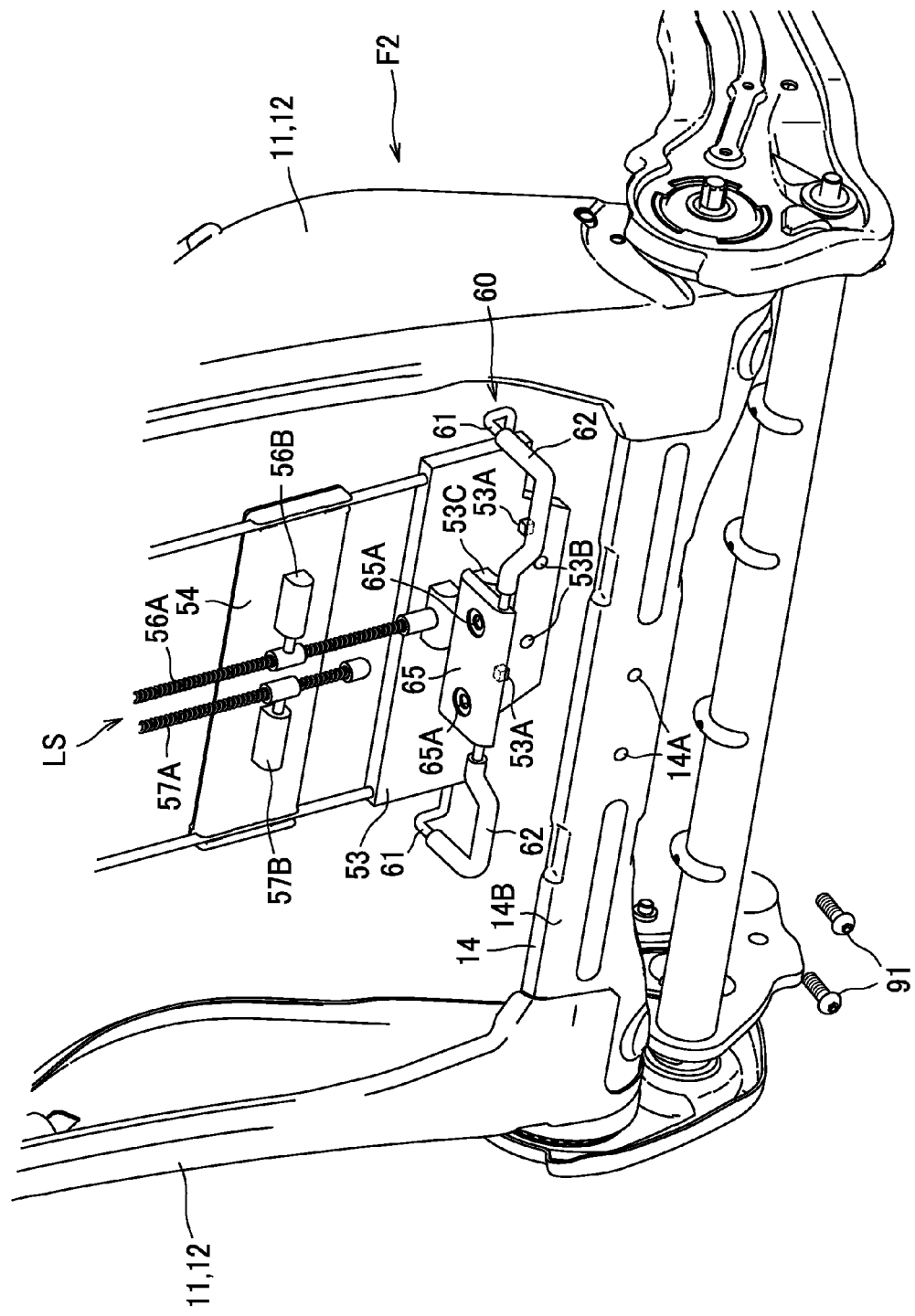
FIG. 8 is a perspective view illustrating the operation of turning the lower hook portion around in an upper position and placing the same over a lower frame from above.

As shown in FIG. 8, left and right fixing holes 53B arranged side by side are provided in the back side surface of the lower connecting portion 53. The fixing holes 53B are holes with or without internal threads formed therein, in which the screws 91 are to be screwed.

Furthermore, the lower connecting portion 53 includes, as shown in FIG. 3, a restriction portion 53C protruding rearward that is provided in a laterally central position of a back side surface of the lower connecting portion 53. The restriction portion 53C is a portion configured to engage with an upper side of the lower frame 14 to thereby restrict the position of the lumbar support device LS in a vertical direction. At a rear end portion of the restriction portion 53C, a hook portion 53D extending downward to a small extent is formed; as the hook portion 53D is configured to be hooked on a rear surface 14B (see FIG. 10) of the lower frame 14, the lumbar support device LS is made unlikely to disengage.

The lower up-and-down motion plate 54 is a member that is movable upward and downward wherein its movement is guided by guide wires 51. The lower up-and-down motion plate 54 includes guide portions 54A disposed at left and right ends thereof and having grooves engageable with two guide wires 51, respectively; the guide portions 54A are thereby engaged with the guide wires 51. At the back surface of the lower up-and-down motion plate 54, a motor 56B of the support portion raising and lowering mechanism 56 and a motor 57B of the arch deformation mechanism 57 are fixed.

The upper up-and-down motion plate 55 is a member that is movable upward and downward wherein its movement is guided by guide wires 51, and that is disposed above the lower up-and-down motion plate 54. The upper up-and-down motion plate 55 includes guide portions 55A disposed at left and right ends thereof and having grooves engageable with two guide wires 51, respectively; the guide portions 55A are thereby engaged with the guide wires 51.

The support portion raising and lowering mechanism 56 is a mechanism that causes the lower up-and-down motion plate 54 and the upper up-and-down motion plate 55 to move upward and downward together as a whole, and includes a screw shaft 56A, a motor 56B, a nut 56C, an upper end anchor portion 56D, and a lower end anchor portion 56E.

The screw shaft 56A is a rod having an external thread formed on an outer peripheral surface thereof, and having an elongate shape long in the upward-downward direction.

The motor 56B is an electric motor including an output shaft rotatable in both of normal and reverse directions under control of a controller (not shown).

The nut 56C is connected with the motor 56B by a gear train (not shown) and configured to be rotatable in either of normal and reverse directions in accordance with the direction of rotational motion produced by the motor 56B. The nut 56C is engaged with the screw shaft 56A, and configured to move upward and downward relative to the screw shaft 56A by its own rotation.

The upper end anchor portion 56D is a part which is provided at an upper end of the screw shaft 56A and by which the upper end of the screw shaft 56A is fixed to the rear surface of the upper connecting portion 52.

The lower end anchor portion 56E is a part which is provided at a lower end of the screw shaft 56A and by which the lower end of the screw shaft 56A is fixed to the rear surface of the lower connecting portion 53.

The arch deformation mechanism 57 is a mechanism that causes the upper up-and-down motion plate 55 to move upward and downward relative to the lower up-and-down motion plate 54, and includes a screw shaft 57A, a motor 57B, a nut 57C, an upper end anchor portion 57D, and a cap 57E.

The screw shaft 57A is a rod having an external thread formed on an outer peripheral surface thereof, and having an elongate shape long in the upward-downward direction.

The motor 57B is an electric motor including an output shaft rotatable in both of normal and reverse directions under control of the controller (not shown).

The nut 57C is connected with the motor 57B by a gear train (not shown) and configured to be rotatable in either of normal and reverse directions in accordance with the direction of rotational motion produced by the motor 57B. The nut 57C is engaged with the screw shaft 57A, and configured to move upward and downward relative to the screw shaft 57A by its own rotation.

The upper end anchor portion 57D is a part which is provided at an upper end of the screw shaft 57A and by which the upper end of the screw shaft 57A is fixed to the rear surface of the upper up-and-down motion plate 55.

The cap 57E is a part which is provided at a lower end of the screw shaft 57A and by which the lower end of the screw shaft 57A can be made unlikely to have surrounding objects hitched thereon.

Referring back to FIG. 2, each arch member 58 is illustrated as a belt-shaped member elongate in the upward-downward direction, and made of an elastic metal sheet. The arch member 58 has an upper end fixed on a front surface of the upper up-and-down motion plate 55 and a lower end fixed on a front surface of the lower up-and-down motion plate 54 by rivets, screws, or the like. Two arch members 58, arranged side by side, are disposed near left and right end portions of the lower up-and-down motion plate 54 and the upper up-and-down motion plate 55, and so located as to face the rear surface of the center portion 41 of the pressure-receiving plate 40.

As shown in FIG. 3, the support wires 59 are wires, each having a circular shape in cross section, so disposed as to extend upward from left and right end portions of the upper connecting portion 52. The two support wires 59 are made integral with the upper connecting portion 52 by insert molding process. Although not illustrated in the drawings, the two support wires 59 are connected to each other at the lower end portions thereof and constitute a single U-shaped wire. The upper end portions of the support wires 59 (to be more specific, the portions contactable with the support holes 15B) are provided with coverings 59A of nylon or other plastic material having an adequate slidability. With the coverings 59A, noises which would be caused by up-and-down sliding motion of the support wires 59 on the inside of the support holes 15B when a load is imposed on or removed from the seat back by an occupant can be reduced.

It is to be understood that, of the above-described elements of the lumbar support device LS, portion except the support wires 59 and the lower hook portion 60 refers to a pressure-receiving member main body.

Hereinafter, a brief description will be given of the operation of the lumbar support device LS.

Figure 4:
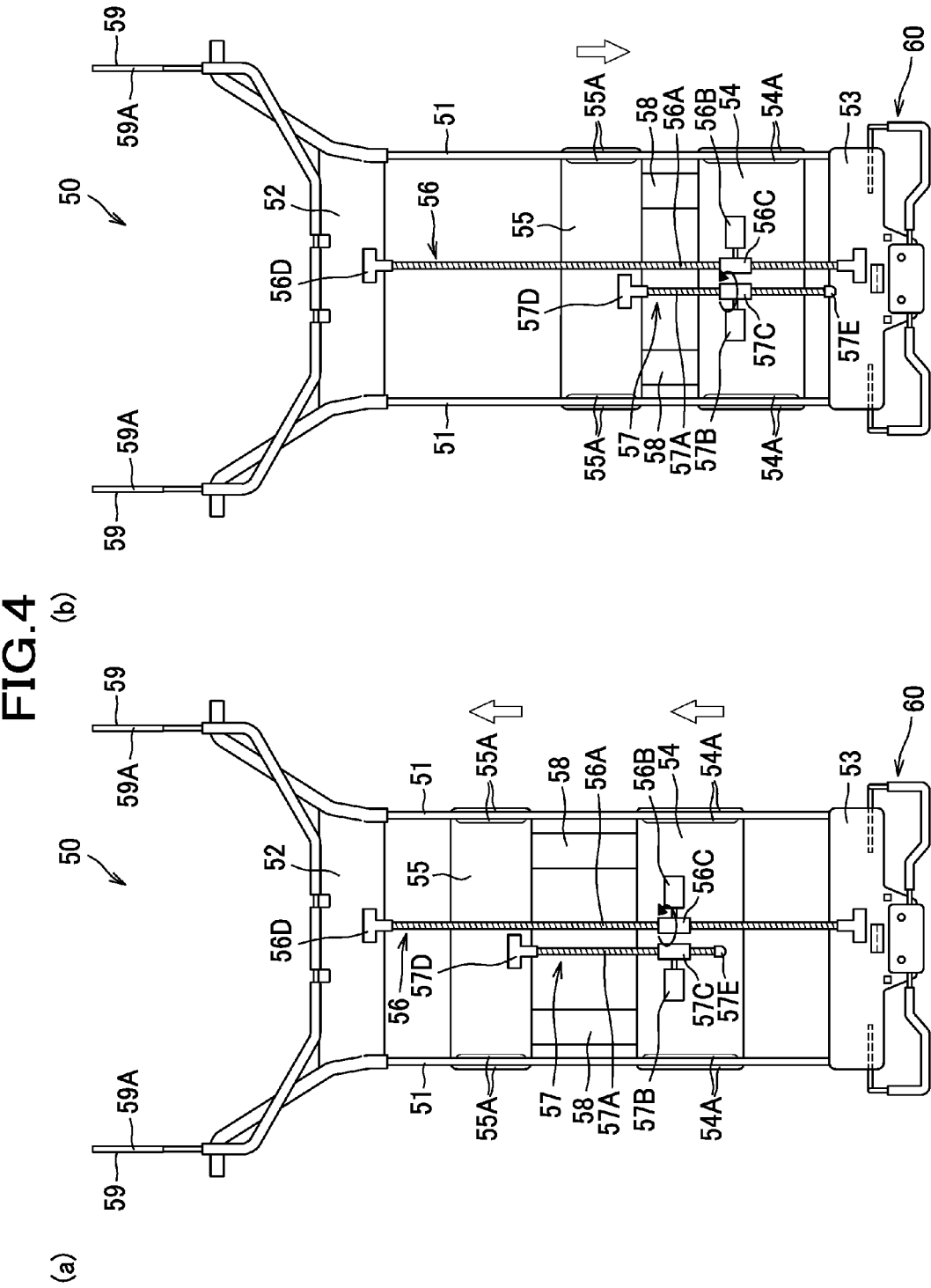
FIG. 4 includes a diagram for explaining the operation of the support frame, showing (a) a state in which an upper up-and-down motion plate and a lower up-and-down motion plate have been raised together, and (b) a state in which an upper up-and-down motion plate has been lowered.

As shown in FIG. 4(a), when the output shaft of the motor 56B is caused to rotate and the nut 56C is thereby caused to rotate, the nut 56C moves relative to the screw shaft 56A. For example, when the nut 56C moves upward relative to the screw shaft 56A, as shown in FIG. 4(a), the upper up-and-down motion plate 55 and the lower up-and-down motion plate 54 as a whole move upward together. During this process, the upper up-and-down motion plate 55 and the lower up-and-down motion plate 54 are guided by the guide wires 51 and caused to slide along the guide wires 51.

As shown in FIG. 4(b), when the output shaft of the motor 57B is caused to rotate and the nut 57C is thereby caused to rotate, the nut 57C moves relative to the screw shaft 57A. Hereupon, the nut 57C is prevented from moving upward and downward relative to the lower up-and-down motion plate 54; therefore, as the nut 57C rotates, the screw shaft 57A moves upward or downward. For example, when the nut 57C is caused to rotate, as shown in FIG. 4(b), the screw shaft 57A moves down, and the upper up-and-down motion plate 55 is caused to move, by this movement of the screw shaft 57A, downward relative to the lower up-and-down motion plate 54. During this process, the upper up-and-down motion plate 55 is guided by the guide wires 51 and caused to slide along the guide wires 51.

Figure 5:
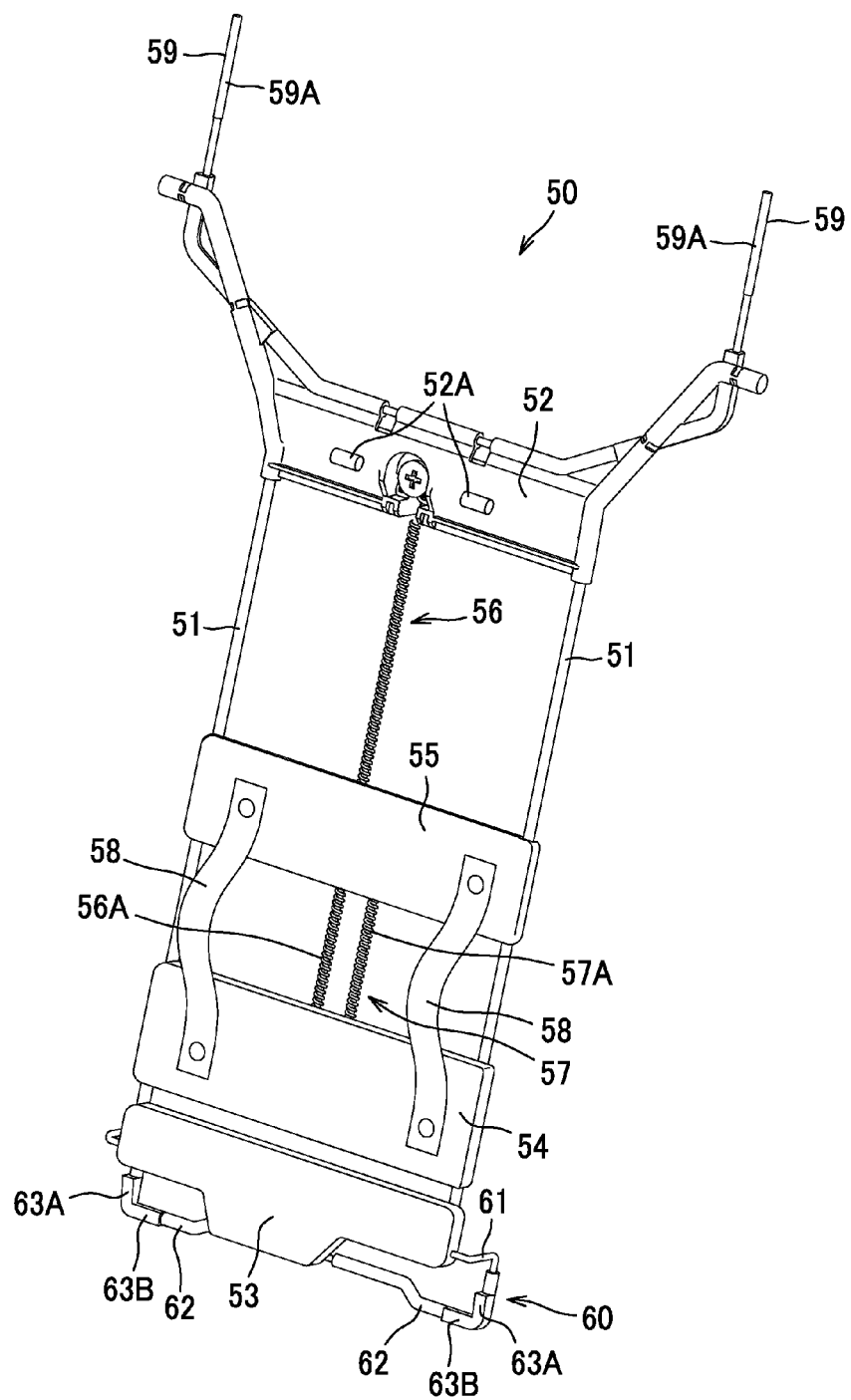
FIG. 5 is a perspective view showing a state in which the upper up-and-down motion plate has been lowered and an arch member protrudes frontward.

When the upper up-and-down motion plate 55 gets near the lower up-and-down motion plate 54 as shown in FIG. 4(b), the length of the arch members 58 becomes in excess of the distance between the upper up-and-down motion plate 55 and the lower up-and-down motion plate 54, thus causing the arch member 58 to become embowed frontward as shown in FIG. 5. Accordingly, the front surfaces of the arch members 58 push the back surface of the center portion 41 of the pressure-receiving plate 40, so as to cause the center portion 41 to bend in a bow and protrude frontward. By causing the motor 56B and the motor 57B to produce normal and reverse rotations, the amount of frontward protrusion of the pressure-receiving plate 40 and the vertical position of the protruding portion of the pressure-receiving plate 40 can be adjusted, so that the lumbar region of the occupant can be supported as desired.

Figure 9:
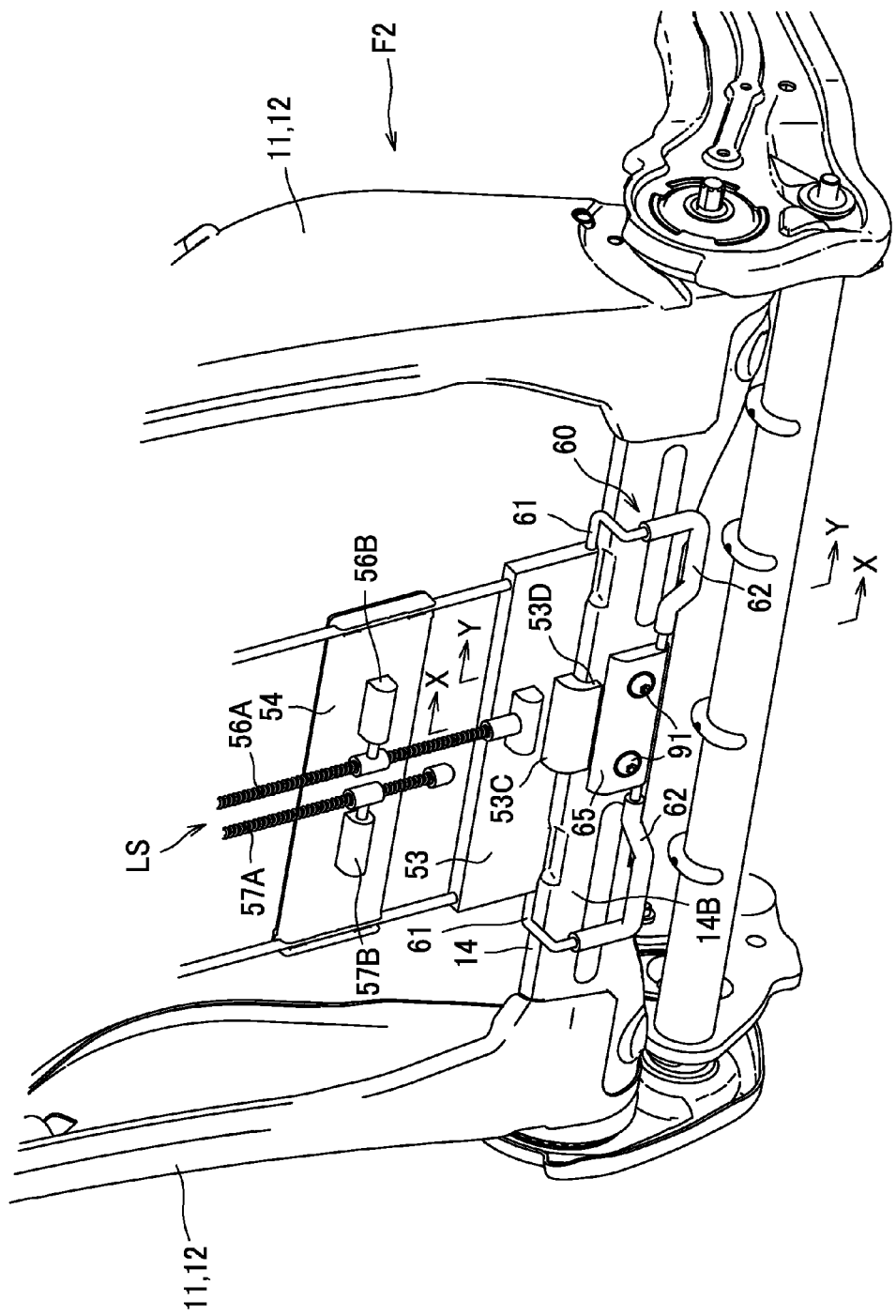
FIG. 9 is a perspective view showing a state in which the lower hook portion has been placed over the lower frame from above, turned around to a lower position, and fastened by screws.

Next, a detailed description will be given of the lower hook portion 60 by which the lower portion of the lumbar support device LS is fastened to the lower frame 14. The lower hook portion 60 is, as shown in FIG. 9, a member configured to lie from above an upper side of the lower frame 14 to a rear side of the lower frame 14, whereby the lower part of the lumbar support device LS is made mountable to the seat back frame F2.

As shown in FIGS. 6(a), (b), the lower hook portion 60 includes a wire frame 61 as an example of a wire, coverings 62, and an attaching portion 65.

The wire frame 61 is formed by bending a single metal wire, and configured to be substantially symmetric in the lateral direction. The wire frame 61 includes two shaft portions 61A disposed in positions separate from each other and extending in the lateral direction, rearward extension portions 61B each extending rearward from a laterally outer end of a corresponding shaft portion 61A, downward extension portions 61C each extending downward from a rear end of a corresponding rearward extension portion 61B, and a connecting portion 61D connecting lower ends of the downward extension portions 61C. Herein, the rearward extension portions 61B that extend rearward is an example of "first portion", and the downward extension portions 61C and the connecting portion 61D that extend from the rear ends of the rearward extension portions 61B and lie along the rear side of the lower frame 14 are an example of "second portion". The connecting portion 61D is so bent as to have a center portion thereof offset above to a small extent, and the attaching portion 65 is provided on this center portion. The wire frame 61 is configured to have the rearward extension portions 61B extending from the shaft portions 61A rearward whereby the downward extension portions 61C and the connecting portion 61D are so located as to lie along the rear side of the lower frame 14.

The coverings 62 are plastic members with which the outside of the wire frames 61 are covered through insert molding process. Each covering 62 includes a first covering portion 62A with which a lower portion of the downward extension portion 61C of the wire frame 61 is covered, and a second covering portion 62B with which a laterally outer portion of the connecting portion 61D of the wire frame 61 is covered. The first covering portion 62A and the second covering portion 62B are configured to be on the rear side of the lower frame 14 in a state after the lower hook portion 60 has been caused to engage with the lower frame 14.

Each first covering portion 62A includes a frontward protruding portion provided substantially at a lower half thereof, which has a first contact portion 63A configured to be contactable with a rear surface 14B (see FIG. 8) of the lower frame 14 when the attaching portion 65 is fastened to the lower frame 14 by the screws 91. Each second covering portion 62B includes a frontward protruding portion provided at a laterally outer end thereof, which has a second contact portion 63B configured to be contactable with the rear surface of the lower frame 14 when the attaching portion 65 is fastened to the lower frame 14 by the screws 91. A lower end of the first contact portion 63A and a laterally outer end of the second contact portion 63B are joined with each other; thus, the first contact portion 63A and the second contact portion 63B have an L-shaped configuration as a whole. The first contact portion 63A and the second contact portion 63B are disposed at the left side and the right side of the attaching portion 65.

The first contact portion 63A has an elongate shape long in the upward-downward direction as an example of a first direction, extending at the rear side of the lower frame 14, and the second contact portion 63B has an elongate shape long in the lateral direction as an example of a second direction, extending at the rear side of the lower frame 14; the first and second contact surfaces 63A, 63B are both configured to contact the lower frame 14 from the rear side. Since the portions extending in different directions are configured to contact the rear surface 14B of the lower frame 14, the posture of the lower hook portion 60 relative to the lower frame 14 is stabilized, and the lumbar support device LS can be supported stably.

Figure 10:
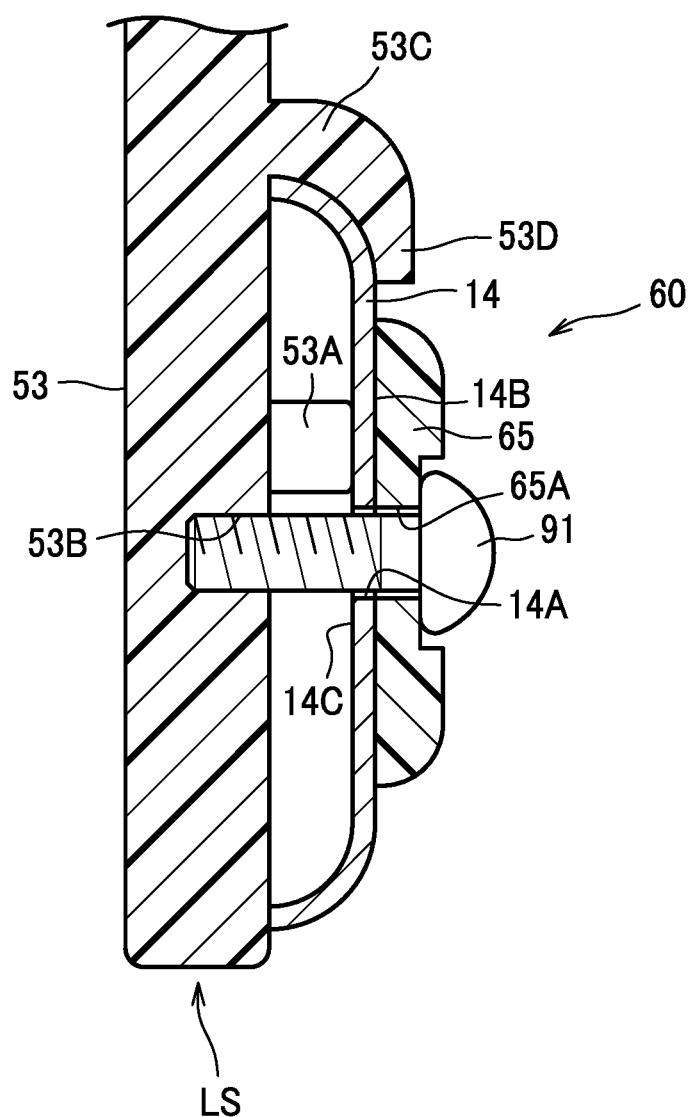
FIG. 10 is a sectional view taken along line X-X of FIG. 9.
Figure 11:
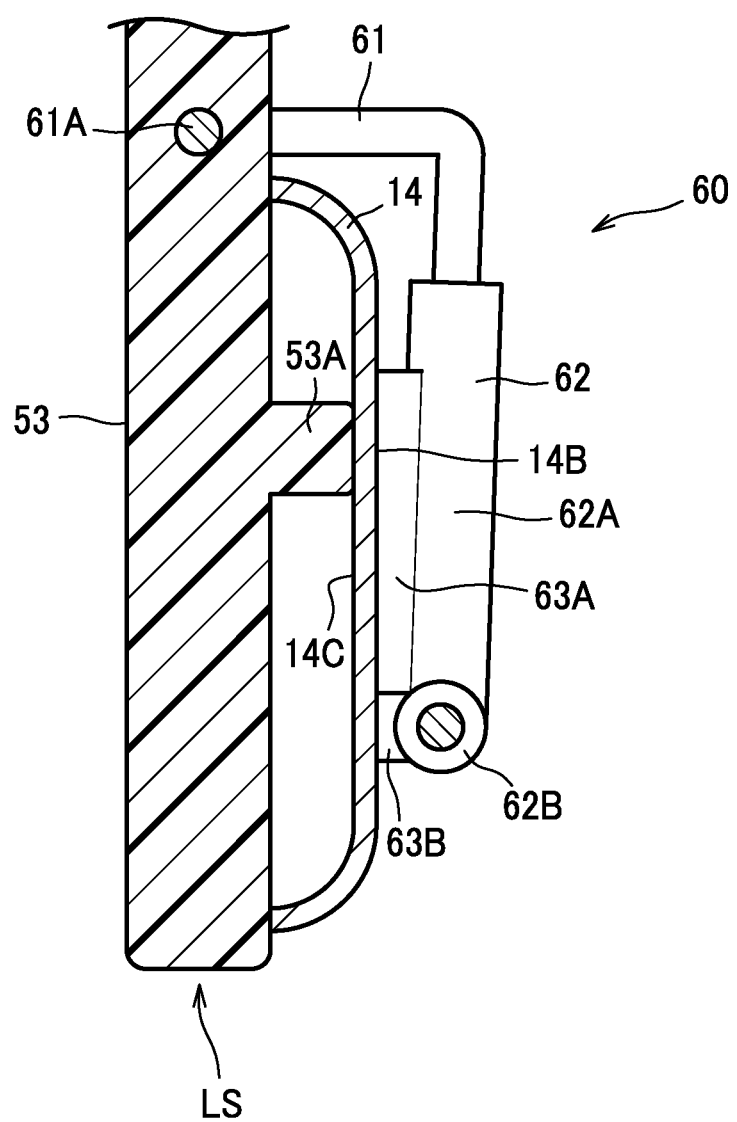
FIG. 11 is a sectional view taken along line Y-Y of FIG. 9.

The attaching portion 65 is a plastic member formed through insert molding process by which the wire frame 61 is integrated with the attaching portion 65. The attaching portion 65 has fixing holes 65A through which screws 91 are to be inserted, in positions corresponding to the mounting holes 14A of the lower frame 14. The attaching portion 65 is fastened to the lower frame 14 by the screws 91; the attaching portion 65 is configured to contact the rear surface 14B of the lower frame 14 in a state after being fastened thereto, as shown in FIG. 10. As shown in FIGS. 10 and 11, the lower frame 14 is located between part (the attaching portion 65 and the coverings 62) of the lower hook portion 60 and part (the lower connecting portion 53) of the pressure-receiving member main body, and the lower frame 14 is held by the attaching portion 65, the coverings 62 and the lower connecting portion 53.

The shaft portion 61A is fitted in a groove or hole formed in the lower connecting portion 53, and configured to be rotatable on the lower connecting portion 53. In other words, the lower hook portion 60 is configured to be rotatable about the shaft portion 61A relative to the lower connecting portion 53 (pressure-receiving member main body).

Next, a description will be given of a method of mounting the lumbar support device LS to the seat back frame F2.

As shown in FIG. 7, the lumbar support device LS is located under the bridging frame 15; then, while the upper ends of support wires 59 are kept aimed at the support holes 15B, the lumbar support device LS is moved up. In this way, the support wires 59 are inserted into the support holes 15B. Consequently, the position of the upper part of the lumbar support device LS (pressure-receiving member main body) in the front-rear and lateral directions are restricted.

Next, as shown in FIG. 8, the lower hook portion 60 is swung up relative to the lower connecting portion 53, and the lower hook portion 60 is moved over the lower frame 14, to cause the lower connecting portion 53 to get closer to the lower frame 14.

Thereafter, as shown in FIG. 9, the restriction portion 53C is placed on the lower frame 14, and the hook portion 53D of the restriction portion 53C is hooked over the rear surface 14B of the lower frame 14. Accordingly, the position of the lumbar support device LS in the vertical direction is restricted. In addition, this engagement of the hook portion 53D with the rear surface 14B of the lower frame 14 makes the subsequent work of fastening of the lumbar support device LS by the screws 91 easier.

Next, the lower hook portion 60 is swung down and causes the coverings 62 and the attaching portion 65 to come in contact with the rear surface 14B of the lower frame 14. Further, the screws 91 are inserted through the fixing holes 65A (see FIG. 8) of the attaching portion 65, and screwed into the mounting holes 14A (see FIG. 8) of the lower frame 14. In this way, the lower frame 14 are held by the lower hook portion 60 and the lower connecting portion 53, and the lower part of the lumbar support device LS can be fixed to the lower frame 14, as shown in FIG. 10.

In this operation, the lower hook portion 60 can be located at the rear side of the lower frame 14 by rotating the lower hook portion 60; this work can be performed with ease. Moreover, this operation results in the lower hook portion 60 so placed to span from the upper side of the lower frame 14 to the rear side of the lower frame 14, and thus makes the lower part of the lumbar support device LS unlikely to come off in the downward or frontward direction. Furthermore, the resulting location of the lower frame 14 between the lower connecting portion 53 and the lower hook portion 60 also makes the lower part of the lumbar support device LS unlikely to come off from the lower frame 14. In this way, the fastening operation using the screws 91 can be carried out under the state in which the lumbar support device LS is unlikely to come off; therefore, the ease of installation work can be ensured.

Since the attaching portion 65 is fastened to the lower frame 14 by screws 91, the lower part of the lumbar support device LS (pressure-receiving member main body) can be fixed securely to the seat back frame F2. In this fixing operation, since the screws 91 are applied from the rear side and engaged with the seat back frame F2 and the lumbar support device LS, the fastening work can be accompanied by a visual check to make sure that the restriction portion 53C is properly engaged with the lower frame 14.

Furthermore, after the fastening by the screws 91, the projections 53A of the lower connecting portion 53 made of plastic are in contact with the front surface 14C of the lower frame 14, the restriction portion 53C made of plastic is in contact with the upper side surface of the lower frame 14, and the attaching portion 65, first contact portion 63A and second contact portion 63B (see FIG. 11) made of plastic are in contact with the rear surface 14B of the lower frame 14; therefore, even if a load were imposed on the lumbar support device LS, the lower frame 14 and wire frame 61 made of metal would not come in contact with each other, noises are unlikely to occur because any members which would contact the lower frame 14 are made of plastic.

Moreover, after the fastening by the screws 91, the presence of the first contact portion 63A and the second contact portion 63B can serve to stabilize the posture of the lower hook portion 60 relative to the lower frame 14, and to stabilize the lumbar support device LS.

When the lumbar support device LS is fixed to the seat back frame F2 as described above, the lower hook portion 60 is disposed in such a position that part of the lower hook portion 60 overlaps the pressure-receiving plate 40 as viewed from the front or rear direction.

With the car seat S according to the present embodiment, the lumbar support device LS is not fixed by slinging it on the side frames 11, but supported on the lower frame 14 and the bridging frame 15 both of which connect the left and right side frames 11; therefore, other parts can be attached to the side frames 11, and efficiency in utilization of the limited space inside the seat back can be improved.

Although the embodiment has been described above, the present invention is not limited to the above-described embodiment. Specific configurations may be modified where appropriate without departing from the gist of the present invention.

Figure 12:
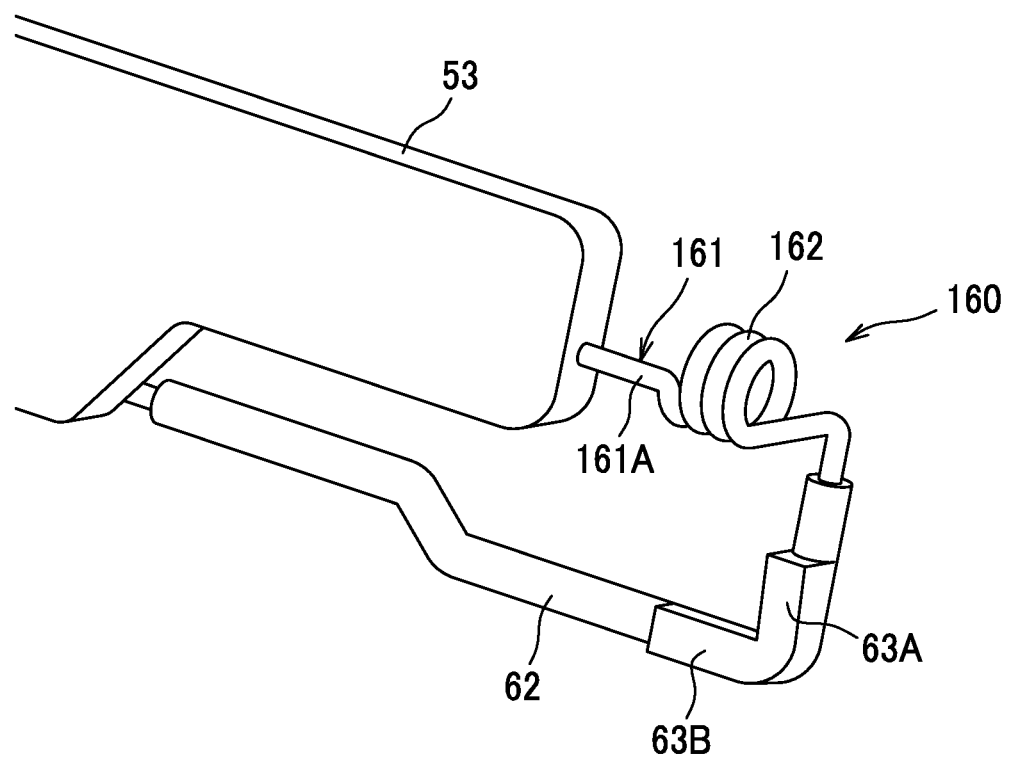
FIG. 12 is a diagram showing a modified example of the lower hook portion.

For example, as in a modified example shown in FIG. 12, a lower hook portion 160 may include a wire frame 161 provided with a coiled portion 162 so that the lower hook portion 160 has a springiness that produces a turning force in the clockwise direction of the drawing. In this embodiment, a shaft portion 161A is not swingably engaged with but unswingably fixed to the lower connecting portion 53. According to this configuration, with the springiness of the lower hook portion 160, the lower hook portion 60 can be warped backward and located over the rear side of the lower frame 14, and the lumbar support device LS (pressure-receiving member main body) can be biased toward the lower frame 14 of the seat back frame F2; therefore, the lumbar support device LS in the tentatively mounted state prior to the fastening by the screws 91 can be stabilized more, and thus can be worked on with increased ease during installation.

To provide easy-to-understand illustration of the springiness, the embodiment of FIG. 12 with the coiled portion 162 has been exemplified above; however, as long as the shaft portion 161A is of such a dimension and material as representing a resiliently twistable property, the wire frame 161 may include no coiled portion 162 and have a configuration similar to that of the lower hook portion 60 as in the above-described embodiment. Alternatively or additionally, a torsion spring as a separate part may be mounted to the lower hook portion 60 of the above-described embodiment to provide springiness.

In the above-described embodiment, the lumbar support device LS is illustrated as an example of a pressure-receiving member, but the pressure-receiving member may be a simple pressure-receiving plate having no function of changing the shape around the lumbar region of an occupant.

In the above-described embodiment, the support holes 15B are provided in the bridging frame 15, but may be provided in upper portions of the side frames 11, instead.

In the above-described embodiment, the coverings 62 are provided to cover part of the wire frame 61, but may be provided to cover the entire wire. The lower hook portion 60 may be so disposed as to overlap the entire pressure-receiving plate 40 as viewed from the front or rear direction.

In the above-described embodiments, the car seat for an automobile is illustrated as an example of a vehicle seat, but the vehicle seat may be a seat for a rail car, an aircraft and a ship, etc.

The invention claimed is:

1. A vehicle seat comprising:
a seat back frame; and
a pressure-receiving member supported by the seat back frame, the pressure-receiving member including a pressure-receiving plate configured to receive a load from a back of an occupant,
wherein the seat back frame includes a support hole disposed at an upper part thereof and a support portion disposed at a lower part thereof, the support hole extending through the seat back frame in such a direction as to connect an upper side and a lower side of the upper part,
wherein the seat back frame includes side frames disposed in laterally separate positions, and a bridging member by which upper portions of the side frames are connected with each other,
wherein the support hole is disposed in the bridging member,
wherein the support portion is a connecting member by which lower portions of the side frames are connected with each other,
wherein the pressure-receiving member comprises a pressure-receiving member main body including the pressure-receiving plate, an upper restriction portion disposed at an upper part of the pressure-receiving member main body, and a lower hook portion disposed at a lower part of the pressure-receiving member main body,
wherein the upper restriction portion comprises a support wire configured to be inserted, in the support hole to thereby restrict a position of an upper part of the pressure-receiving member in front-rear and lateral directions,
wherein the lower hook portion comprises a wire and includes a first portion extending from the lower part of the pressure-receiving member main body and protruding rearward over an upper side of the support portion, and a second portion extending from a rear end of the first portion and lying along a rear side of the support portion, such that the lower part of the pressure-receiving member main body is mountable to the seat back frame by using the first portion and the second portion,
wherein the lower hook portion includes a first contact portion extending in a first direction at the rear side of the support portion to contact the support portion, and a second contact portion extending in a second direction different from the first direction at the rear side of the support portion to contact the support portion, and wherein the lower hook portion includes a covering provided to cover at least part of the wire, and wherein the first contact portion and the second contact portion are provided on the covering.

2. The vehicle seat according to claim 1, wherein the support portion is disposed between the lower hook portion and the lower part of the pressure-receiving member main body.

3. The vehicle seat according to claim 1, further comprising a fastening member with which the lower hook portion is fastened to the support portion, and wherein the lower hook portion includes an attaching portion to be fastened by the fastening member.

4. The vehicle seat according to claim 3, wherein the first contact portion and the second contact portion are both located on each of left and right sides of the fastening member.

5. The vehicle seat according to claim 1, wherein the lower hook portion has a springiness with which the lower hook portion is configured to bias the pressure-receiving member main body toward the seat back frame.

6. The vehicle seat according to claim 1, wherein the pressure-receiving member main body includes a restriction portion engageable with the support portion to thereby restrict a position of the pressure-receiving member main body in a vertical direction.

7. The vehicle seat according to claim 1, wherein the lower hook portion is disposed in such a position that at least part of the lower hook portion overlaps the pressure-receiving plate as viewed from a front or rear direction.

8. A vehicle seat comprising:

a seat back frame; and a pressure-receiving member supported by the seat back frame, the pressure-receiving member including a pressure-receiving plate configured to receive a load from a back of an occupant, wherein the seat back frame includes a support hole disposed at an upper part thereof and a support portion disposed at a lower part thereof, the support hole extending through the seat back frame in such a direction as to connect an upper side and a lower side of the upper part, wherein the seat back frame includes side frames disposed in laterally separate positions, and a bridging member by which upper portions of the side frames are connected with each other, wherein the support hole is disposed in the bridging member, wherein the support portion is a connecting member by which lower portions of the side frames are connected with each other, wherein the pressure-receiving member comprises a pressure-receiving member main body including the pressure-receiving plate, an upper restriction portion disposed at an upper part of the pressure-receiving member main body, and a lower hook portion disposed at a lower part of the pressure-receiving member main body, wherein the upper restriction portion comprises a support wire configured to be inserted, in the support hole to thereby restrict a position of an upper part of the pressure-receiving member in front-rear and lateral directions, wherein the lower hook portion comprises a wire and includes a first portion extending from the lower part of the pressure-receiving member main body and protruding rearward over an upper side of the support portion, and a second portion extending from a rear end of the first portion and lying along a rear side of the support portion, such that the lower part of the pressure-receiving member main body is mountable to the seat back frame by using the first portion and the second portion, and wherein the lower hook portion is rotatable relative to the pressure-receiving member main body.

9. The vehicle seat according to claim 8, wherein the lower hook portion includes a first contact portion extending in a first direction at the rear side of the support portion to contact the support portion, and a second contact portion extending in a second direction different from the first direction at the rear side of the support portion to contact the support portion.

10. The vehicle seat according to claim 9, further comprising a fastening member with which the lower hook portion is fastened to the support portion, wherein the lower hook portion includes an attaching portion to be fastened by the fastening member, and wherein the first contact portion and the second contact portion are both located on each of left and right sides of the fastening member.

11. The vehicle seat according to claim 8, wherein the support portion is disposed between the lower hook portion and the lower part of the pressure-receiving member main body.

12. The vehicle seat according to claim 8, wherein the lower hook portion has a springiness with which the lower hook portion is configured to bias the pressure-receiving member main body toward the seat back frame.

13. The vehicle seat according to claim 8, wherein the pressure-receiving member main body includes a restriction portion engageable with the support portion to thereby restrict a position of the pressure-receiving member main body in a vertical direction.

14. The vehicle seat according to claim 8, further comprising a fastening member with which the lower hook portion is fastened to the support portion, and wherein the lower hook portion includes an attaching portion to be fastened by the fastening member.

15. The vehicle seat according to claim 8, wherein the lower hook portion is disposed in such a position that at least part of the lower hook portion overlaps the pressure-receiving plate as viewed from a front or rear direction.

16. A vehicle seat comprising:

a seat back frame;

a pressure-receiving member supported by the seat back frame, the pressure-receiving member including a pressure-receiving plate configured to receive a load from a back of an occupant, wherein the seat back frame includes a support hole disposed at an upper part thereof and a support portion disposed at a lower part thereof, the support hole extending through the seat back frame in such a direction as to connect an upper side and a lower side of the upper part, wherein the seat back frame includes side frames disposed in laterally separate positions, and a bridging member by which upper portions of the side frames are connected with each other, wherein the support hole is disposed in the bridging member, wherein the support portion is a connecting member by which lower portions of the side frames are connected with each other, wherein the pressure-receiving member comprises a pressure-receiving member main body including the pressure-receiving plate, an upper restriction portion disposed at an upper part of the pressure-receiving member main body, and a lower hook portion disposed at a lower part of the pressure-receiving member main body, wherein the upper restriction portion comprises a support wire configured to be inserted, in the support hole to thereby restrict a position of an upper part of the pressure-receiving member in front-rear and lateral directions, wherein the lower hook portion comprises a wire and includes a first portion extending from the lower part of the pressure-receiving member main body and protruding rearward over an upper side of the support portion, and a second portion extending from a rear end of the first portion and lying along a rear side of the support portion, such that the lower part of the pressure-receiving member main body is mountable to the seat back frame by using the first portion and the second portion; and a fastening member with which the lower hook portion is fastened to the support portion, wherein the lower hook portion includes an attaching portion to be fastened by the fastening member.

17. The vehicle seat according to claim 16, wherein the support portion is disposed between the lower hook portion and the lower part of the pressure-receiving member main body.

18. The vehicle seat according to claim 16, wherein the lower hook portion has a springiness with which the lower hook portion is configured to bias the pressure-receiving member main body toward the seat back frame.

19. The vehicle seat according to claim 16, wherein the pressure-receiving member main body includes a restriction portion engageable with the support portion to thereby restrict a position of the pressure-receiving member main body in a vertical direction.

20. The vehicle seat according to claim 16, wherein the lower hook portion is disposed in such a position that at least part of the lower hook portion overlaps the pressure-receiving plate as viewed from a front or rear direction.

* * * * *